US009789582B2

United States Patent
Haas et al.

(10) Patent No.: US 9,789,582 B2
(45) Date of Patent: Oct. 17, 2017

(54) METHOD AND COMPRESSION APPARATUS FOR INTRODUCING RESIDUAL COMPRESSION INTO A COMPONENT HAVING A REGULAR OR AN IRREGULAR SHAPED SURFACE

(71) Applicant: Surface Technology Holdings, Ltd., Cincinnati, OH (US)

(72) Inventors: John E. Haas, Hebron, KY (US); Larry J. Unger, Chillicothe, OH (US); Russell A. Lascelles, Cincinnati, OH (US); Michael P. Prevey, Cincinnati, OH (US); Paul S. Prevey, III, Cincinnati, OH (US)

(73) Assignee: SURFACE TECHNOLOGY HOLDINGS LTD., Cincinnati, OH (US)

(*) Notice: Subject to any disclaimer, the term of this patent is extended or adjusted under 35 U.S.C. 154(b) by 186 days.

(21) Appl. No.: 13/834,818

(22) Filed: Mar. 15, 2013

(65) Prior Publication Data

US 2014/0007394 A1  Jan. 9, 2014

Related U.S. Application Data

(60) Provisional application No. 61/668,111, filed on Jul. 5, 2012.

(51) Int. Cl.
*B21D 31/06* (2006.01)
*B24B 39/00* (2006.01)
(Continued)

(52) U.S. Cl.
CPC .............. *B24B 39/006* (2013.01); *B23P 9/04* (2013.01); *B24B 27/0038* (2013.01); *C21D 1/02* (2013.01);
(Continued)

(58) Field of Classification Search
CPC ... B24B 39/006; B24B 27/0038; B24B 39/00; B24B 49/16; C21D 7/04; C21D 1/06;
(Continued)

(56) References Cited

U.S. PATENT DOCUMENTS 937,180 A    10/1909  Ridd
1,483,328 A   2/1924  Booker
(Continued)

FOREIGN PATENT DOCUMENTS

SU        1058765        12/1983

OTHER PUBLICATIONS

B. Hazel, J. Cote, Y. Laroche & P. Monhenot, In-situ Robotic Interventions in Hydraulic Turbines, 1st International Conference on Applied Robotics for the Power Industry, Oct. 5-7, 2010.
(Continued)

*Primary Examiner* — Jun Yoo
(74) *Attorney, Agent, or Firm* — Mark F. Smith; Smith Brandenburg Ltd (57) ABSTRACT

A method and apparatus for improving the fatigue and stress corrosion cracking performance of irregular surfaces, such as welds assemblies of components, using a positioning system, such as a robotic or CNC machine, to position a tool head for inducing compression along and into the surface of a workpiece to automatically follow the surface irregularities. The method and apparatus operates to follow a virtual control surface located below the actual surface of the workpiece thereby allowing the irregular topography surface to be uniformly processed with closed loop process control.

9 Claims, 10 Drawing Sheets

(51) Int. Cl.
   *B24B 27/00* (2006.01)
   *B23P 9/04* (2006.01)
   *C21D 7/04* (2006.01)
   *C21D 1/02* (2006.01)
   *C21D 1/06* (2006.01)

(52) U.S. Cl.
   CPC .............. *C21D 1/06* (2013.01); *C21D 7/04* (2013.01); *Y10T 29/47* (2015.01)

(58) Field of Classification Search
   CPC ...... C21D 1/02; B23P 9/04; B23P 6/00; B23P 9/02; Y10T 29/47
   See application file for complete search history.

(56) References Cited

U.S. PATENT DOCUMENTS

| | | | |
|---|---|---|---|
| 1,784,866 | A | 12/1930 | Fahrenwald |
| 1,986,426 | A | 1/1935 | De Bats |
| 3,770,595 | A | 11/1973 | Cros et al. |
| 3,844,846 | A | 10/1974 | Friske et al. |
| 3,937,055 | A | 2/1976 | Caruso et al. |
| 4,118,846 | A | 10/1978 | Korte |
| 4,320,463 | A | 3/1982 | Hammelstein |
| 4,565,081 | A | 1/1986 | Massee |
| 4,641,510 | A | 2/1987 | Mitsching et al. |
| 5,771,729 | A | 6/1998 | Bailey et al. |
| 5,826,453 | A | 10/1998 | Prevey, III |
| 6,415,486 | B1 | 7/2002 | Prevey, III |
| 6,622,570 | B1 | 9/2003 | Prevey, III |
| 6,926,970 | B2 | 8/2005 | James et al. |
| 7,159,425 | B2 | 1/2007 | Prevey et al. |
| 7,188,398 | B2 | 3/2007 | Prevey |
| 7,600,404 | B2 | 10/2009 | Prevey, III |
| 7,954,348 | B2 | 6/2011 | Forgues et al. |
| 7,966,856 | B1 | 6/2011 | Razi et al. |
| 2005/0217336 | A1 | 10/2005 | Weidmer |
| 2005/0278922 | A1 | 12/2005 | Jacobs |
| 2010/0221118 | A1* | 9/2010 | Prevey, III ................ 416/241 R |
| 2011/0123820 | A1 | 5/2011 | Shimanuki et al. |
| 2011/0223443 | A1* | 9/2011 | Scheel et al. ................ 428/687 |
| 2012/0204390 | A1* | 8/2012 | Prevey et al. ................ 29/90.01 |

OTHER PUBLICATIONS

Denis Thibault, Raynald Simoneau, Jacques Lanteignr & Jean-Luc Fihey, Residual Stresses Induced by Robotized Hammer-Peening, Materials Science Forum, vols. 490-492, pp. 352-357, 2005.

Bruce Hazel, Jean Cote, Yvan Laroche & Patrick Mongenot, Field Repair and Construction of Large Hydropower Equipment with a Portable Robot, Journal of Field Robotics 29(1), pp. 102-122, 2012.

* cited by examiner

Control Diagram

METHOD AND COMPRESSION APPARATUS FOR INTRODUCING RESIDUAL COMPRESSION INTO A COMPONENT HAVING A REGULAR OR AN IRREGULAR SHAPED SURFACE

CROSS REFERENCE TO RELATED APPLICATION

This application relates to and claims benefit of U.S. provisional patent application No. 61/668,111, filed Jul. 5, 2012, entitled: Method and Apparatus for Introducing Residual Compression Into a Component Having an Irregular Shaped Surface and which is incorporated in its entirety by reference.

BACKGROUND OF THE INVENTION

This invention relates to inducing compression along and into the surface of a component and more particularly to a method and apparatus for inducing compressive residual stress along and into the surface of a workpiece having a regular or an irregular surface topography.

Many metallic machines and various structural components are subject to failure by fatigue, corrosion fatigue, or stress corrosion cracking (SCC). Failures generally initiate from the surface of the component in highly stressed areas, often from scratches, corrosion pits, or other surface damage that creates a shallow notch or indentation that produces a local stress concentration. It is well known that surface enhancement, such as the introduction of a layer of compressive residual stress, can if of sufficient magnitude and depth, mitigate the stress concentration due to the damage and greatly improve the "damage tolerance" or fatigue strength and service life of a component. Further, since SCC requires surface tension above a threshold level, placing the surface in residual compression can eliminate or significantly reduce SCC.

The introduction of compressive residual stress is achieved in all practical cases by introducing non-uniform cold work, or plastic strain, into the workpiece. The resulting amount and distribution of residual stress and the resulting change in shape depend upon both amount and distribution of plastic strain and the original geometry of the workpiece.

The introduction of residual stress is also used in the forming of components, such as the curved skin of aircraft wings. For forming applications the magnitude, depth and distribution of the induced stress throughout the workpiece are critical properties requiring precise control.

In some applications, the cold working of the metallic material is used to modify the mechanical and chemical properties of the existing surface or a surface layer deposited by plasma spray, cold spray, plating, or some other process. The original surface and/or the deposited surface layer is deliberately cold worked to a required amount to achieve the desired properties, such as work hardening. Cold working may be followed by heat treatment for crystalline grain refinement or to promote diffusion and bonding of a coating to a substrate. For these surface modification applications the magnitude and distribution of cold working are the critical processing properties that require precise control.

A variety of surface enhancement processes have been developed. Hammer peening of welds is an ancient practice known to eliminate residual tension caused by shrinkage of the hot weld, but is an uncontrolled manual process. Modern processes for inducing compression along and into the surface of a workpiece include shot peening (SP), laser shock peening (LSP), low plasticity burnishing (LPB), deep rolling (DR), ultrasonic peening (UP), ultrasonic needle peening (UNP), flapper peening (FP), and cavitation peening (CP). However, all such methods have limitations that make automated application to certain surfaces, such as irregular topography surfaces often found in welded assemblies, difficult or undesirable.

Application of LPB, DR, CP and LSP all require that the surface of the workpiece or component, to be processed be well defined geometrically so that the mechanical burnishing tool, the cavitation zone, or the laser focal spot can be accurately positioned during processing. The positioning requirements for these methods are similar to machining. Automated processing of welds or other irregular topography surfaces using CNC control is difficult because the workpiece shapes, surface geometries, or irregularities vary making the process non repeatable. Therefore, components having irregular topography surfaces, such as manually welded assemblies, cannot be reliably treated because the irregularities may cause the processing tool to be positioned too close or distant from the surface to be effective, and some regions may be missed altogether during processing.

SP, UP and UNP all utilize a blast of shot propelled from nozzles or thrown from a wheel, a fluidized cloud of shot ricocheting in a chamber, or clusters of randomly impacting needles to deform the surface by covering it with dimples. Programmed robotic direction of shot flow from nozzle peening systems is a common practice. FP utilizes a rotating flexible sheet studded with impacting media (shot) generally positioned manually. One such flapper peening system is disclosed in U.S. Pat. No. 7,954,348 that controls the speed of the rotating "flapper" to regulate the impacting force and speed. While these methods can accommodate processing of an irregular topography surface, such as a manual weld, they impact the surface randomly thereby making it difficult to achieve the optimum surface processing necessary for certain applications. Further, to achieve full coverage of the treated surface the media (shot or needles) impact the surface repeatedly, often as many as 16 times on some areas in order to be sure that most of the surface has been impacted once. The repeated impacts can highly cold work the surface which can be detrimental to work hardening alloys, leaving a compressive layer that is subject to rapid thermal stress relaxation or mechanical overload relaxation in service. Cold working also work softens hardened steels leaving a softened surface layer, and transforms retained austenite causing slight swelling and often results in an unacceptable change in critical dimensions. The depth of compression achievable by shot is limited by the size of the media used, and is generally more shallow than the depth of compression induced by LPB or LSP. Finally, the repeated impacting required of these methods is also simply inefficient in terms of energy usage.

Robotically controlled hammer peening has been developed such as for the peening of welds, where the impacting head follows a fixed path defined by the robot control code. However, such systems do not provide an effective method of controlling and monitoring the performance of the peening process, or for accommodating irregularities in the surface of the workpiece thereby reducing or eliminating the likelihood of inducing the desired or effective compression along surfaces having such irregularities.

Accordingly, a need exists for a method and apparatus of inducing compressive residual stress along and into the surface of workpiece; that can be automated, such as by robotic or CNC machine tools; produces a controlled desired depth and magnitude of compression and cold work; and can be reliably applied with process monitoring to workpieces having an irregular topography surface.

SUMMARY OF THE INVENTION

The present invention is a method and compression apparatus for inducing compression along and into the surface of a component and more particularly, for inducing controlled compression along and into the surface of a component workpiece having a regular or an irregular topography surface. In a preferred embodiment of the invention, the compression apparatus comprises a precision control system, such as a computer numerically controlled (CNC) robot or machine tool, for positioning and controlling the movement of a tool head effective for contacting the surface of the workpiece and inducing compression along and into the surface of the workpiece and for providing an apparatus and method for accommodating topography irregularities along the surface of the workpiece, as may be encountered in cast, welded or similar surfaces.

Preferably, the compression apparatus for inducing compression along and into the surface of a workpiece includes a tool head, such as an impact tool head, having a compression element of a controlled shape, that operates to create a specific controlled zone of plastic deformation and achieving a prescribed depth and magnitude of residual compression (residual compressive stress) along and within the surface of the workpiece.

In another preferred embodiment of the invention, the compression apparatus for inducing compression into and along the surface of a workpiece is in the form of an impact apparatus and includes a control system that operates such that the impacts of the compression element are spaced to minimize excessive deformation (often encountered with conventional shot peening, ultrasonic peening and needle peening) so as to minimize the cold working of the surface by reducing or eliminating random repeat impacts along the surface of the workpiece.

In a preferred embodiment of the invention, the compression apparatus for inducing compression along and into the surface of a workpiece includes a positioning device and a flexible arm assembly extending from an end of the positioning device for supporting the tool head.

In another preferred embodiment of the invention, the flexible arm assembly operates to provide one degree of freedom in flexure such that the tool head is free to move perpendicular (normal) to the surface of the workpiece being worked and parallel to the impact vector of the tool head.

In another preferred embodiment of the invention, the, compression apparatus for inducing compression along and into the surface of a workpiece operates such that a control system, in conjunction with the positioning device, functions to position the tool head and move the tool head such that it follows a nominal virtual control surface defined to be at a distance below the actual surface of the workpiece.

In another preferred embodiment of the invention, the compression apparatus for inducing compression along and into the surface of a workpiece is an impact tool having a control system that functions in conjunction with the positioning device to position and move the tool head such that it follows a nominal virtual control surface defined to be located at a distance within the range of the tool head stroke in the direction towards the surface being treated (the stroke of the tool head) and below the actual surface of the workpiece being treated.

In another preferred embodiment of the invention, the flexible arm assembly operates to accommodate a range of topography irregularities along the surface of the workpiece to be treated.

In a preferred embodiment of the invention, the control surface is selected to accommodate the range of topography irregularities along the surface of the workpiece to be treated.

In another preferred embodiment of the invention, the tool head is an impact tool head driven by a trip hammer or similar device driven pneumatically, hydraulically, magnetically, or electrically at a controlled reciprocating rate of impact.

In another preferred embodiment of the invention, the Impact rate or frequency of the compression element of the tool head is from about 1 to about 100 impacts or strikes per second.

In another preferred embodiment of the invention, the impact rate or frequency is varied to provide a desired spacing between impacts of the compression element of the tool head along the surface of the workpiece.

In another preferred embodiment of the invention, the speed of positioning of the tool head along the surface of the workpiece is varied to provide a desired spacing between impacts of the compression element along the surface of the workpiece.

In another preferred embodiment of the invention, the impact rate or frequency is varied along with speed of positioning of the tool head to change the impact spacing along the surface of the workpiece.

In another preferred embodiment of the invention the striking force of the compression element is selected to provide the desired depth to which the material forming the workpiece is deformed to ensure the depth of the residual compression is achieved.

In a preferred embodiment of the invention, the compression element has a spherical shape for contacting the surface of the workpiece.

In a preferred embodiment of the invention, the compression element has a geometric shape such that the compression element does not produce areas of demarcation along the surface of the workpiece that operate as stress risers.

In a preferred embodiment of the invention, the compression element has a geometric shape with only rounded edges.

In a preferred embodiment of the invention, the tool head comprises more than one impacting surface having a predetermined spacing.

A preferred embodiment of the invention, is a method of inducing compression along the surface of a workpiece comprising the steps of placing a workpiece in position for processing, using a positioning device coupled to a flexible arm assembly and a tool head mounted on the flexible arm assembly such that the flexible arm assembly operates to provide one degree of freedom in flexure such that the tool head is free to move perpendicular (normal) to the surface of the workpiece being worked and parallel to the stroke of the tool head and wherein the tool head has a compression element that operates to impact the surface of the workpiece.

In a preferred embodiment of the invention, the method further comprises the step of using a control device to position and move the tool head such that the compression element operates to impact the surface of the workpiece.

In a preferred embodiment of the invention, the method further comprises the step of using a control device to position and move the tool head such that the compression element operates to travel along the surface of the workpiece.

In another preferred embodiment of the invention, the method further comprises the step of using a control system to direct the movement of the tool head.

In another preferred embodiment of the invention, the control system operates to monitor and record the movement of the tool head and the force being applied against the surface during processing of the workpiece.

In another preferred embodiment of the invention, the control system operates to monitor and record the force being applied by the compression element along the surface of the workpiece.

In another preferred embodiment of the invention, the control system operates to control the force being applied by the compression element against the surface of the workpiece.

In a preferred embodiment of the invention, the tool head is an impact tool head and the impact spacing of the compression element is varied to achieve different states of residual stress by changing the rate at which the tool head follows a control surface.

In another preferred embodiment of the invention, the speed by which the tool head is moved along the surface of the workpiece is varied to change the spacing between impacts or strikes of the compression element along the surface of the workpiece.

In another preferred embodiment of the invention, the force being applied against the surface of the workpiece by the compression element is varied to induce the desired compressive stress along and in the surface of the workpiece.

In another preferred embodiment of the invention, the striking force of the compression element is varied to change the depth of compression along the surface of the workpiece.

In another preferred embodiment of the invention, the striking force of the impact element is varied to change the magnitude of compression along the surface of the workpiece.

In another preferred embodiment of the invention, the impact spacing and force are determined for inducing the desired form, depth, and magnitude of the subsurface residual stress distribution produced and the surface roughness.

In a preferred embodiment of the invention, the elastic deflection of the flexible arm apparatus is selected to accommodate any irregularities of the surface being worked.

In a preferred embodiment of the invention, the tool head is an impact tool with at least one compression element each having a spherical shape for contacting the surface of the workpiece.

In a preferred embodiment of the invention, the tool head is an impact tool with at least one compression element having a geometric shape such that the impact of the compression element does not produce an area of demarcation along the surface of the workpiece that operate as a stress riser.

In a preferred embodiment of the invention, the tool head has at least one compression element each having a geometric shape with only rounded edges.

In a preferred embodiment of the invention, the virtual control surface is defined to be within the actual surface of the workpiece such that it accommodates the range of topography irregularities along the surface of the workpiece.

In a preferred embodiment of the invention, the virtual control surface is defined to be below (further within) the actual surface of the workpiece and within the range of motion of the tool head.

In a preferred embodiment of the invention, one or more compression elements are elastically pressed against the surface of the workpiece by a force equal to the spring constant of the flexible arm apparatus times the distance from the virtual control surface to the point of contact of the one or more compression elements with the surface of the workpiece.

In a preferred embodiment of the invention, the region of the workpiece is selected for impact surface enhancement treatment where fatigue or SCC failures might originate.

In a preferred embodiment of the invention, the control system is a closed loop process.

In another preferred embodiment of the invention the closed loop process is achieved by means of an accelerometer, load cell, microphone or other force or impact transducer attached to the tool head or the flexible arm assembly such that each impact or strike against the surface of the workpiece by a compression element produces an electrical signal that is calibrated to determine the force of impact or strike and monitored by the control system to verify and record the processing.

In a preferred embodiment of the invention, the control system functions to determine if the impact strike of the compression element is not within a predetermined range for producing the desired compression, the control system operates to direct the compression apparatus to re-impact or restrike the surface of the workpiece at the missed position or position of an inadequate impact or strike to ensure complete coverage of the surface, and/or rejects the workpiece and/or indicates that additional processing is required.

In a preferred embodiment of the invention the location of any processing flaw or error is recorded along with the position and/or error in the striking force.

In a preferred embodiment of the invention, the operating parameters are selected to induce the desired compressive stress within and along the surface of the workpiece with the minimum amount of cold working.

A preferred embodiment of the invention is a method of inducing compression or cold work along the surface of a workpiece comprising the steps of placing a workpiece in position for processing, using a control system to direct a tool head having a compression element such that said tool head follows a virtual control surface, wherein said virtual control surface is positioned between the surface of the workpiece and a distance within the workpiece, and using the compression element to contact the surface of the workpiece and provide controlled cold work along and within the surface of the workpiece.

In a preferred embodiment of the invention the method includes the step of using the compression element to contact the surface of the workpiece and create a specific controlled zone of plastic deformation achieving a prescribed depth and magnitude of residual compression along and within the surface of the workpiece.

In a preferred embodiment of the invention the method includes the step of determining the amount of controlled cold work to achieve a desired amount of work hardening the surface of the workpiece.

In a preferred embodiment of the invention the method includes the step of determining the amount of controlled cold work to achieve a desired amount of refined grain structure along and within the surface the surface of the workpiece.

In a preferred embodiment of the invention the method includes the step of heat treating the workpiece.

Other advantages, objects, and embodiments of the invention will be apparent from the following description and the accompanying drawings.

BRIEF DESCRIPTION OF THE DRAWINGS

The forgoing and other features of the invention will be best understood with reference to the following detailed description of a specific embodiment of the invention when read in conjunction with the accompanying drawings, where in.

DETAILED DESCRIPTION OF THE INVENTION

The present invention relates to inducing compression and cold work along and in the surface of component workpieces. In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose.

The apparatus and method of the invention operate to provide controlled plastic strain by compression to create cold work and compressive residual stress along and in the surface of a workpiece having an irregular surface topography, such as welds, castings or re-worked components, for which automated processing, such as be use of CNC controlled machines or robots was not previously practical or reliable. In a preferred embodiment of the invention, the compression apparatus operates as an impact apparatus comprising a precision positioning control system, such as a computer or a numerically controlled (CNC) robot or machine tool, for controlling the movement of a tool head that operates to induce compression along and into the surface of a workpiece.

Preferably, the compression apparatus includes a tool head having a compression element of a controlled or predefined shape that operates to create a specific controlled zone(s) of plastic deformation for achieving a prescribed depth and magnitude of residual compression (compressive stress) along and within the surface of the workpiece. In a preferred embodiment of the invention, the compression apparatus comprises an elastic or spring loaded flexible arm assembly for positioning the tool head such that it follows a predefined virtual control surface while holding the compression element in contact with the workpiece. It should now be understood that in a preferred embodiment of the invention, the contour of the virtual control surface remains substantially constant regardless of any irregularities along the surface of the workpiece. The use of an elastic or spring loaded flexible arm assembly provides an effective system for accommodating any geometric or topography irregularities along the surface of the workpiece, such as may be encountered in cast, welded or similar component surfaces. The defining and use of a virtual control surface eliminates both the need for precise prior knowledge of the workpiece surface topography and the need for complex and expensive systems for locating and following surface irregularities such as a robotic vision system or other system requiring relatively complex sensors for scanning or detecting surface irregularities.

Figure 1:
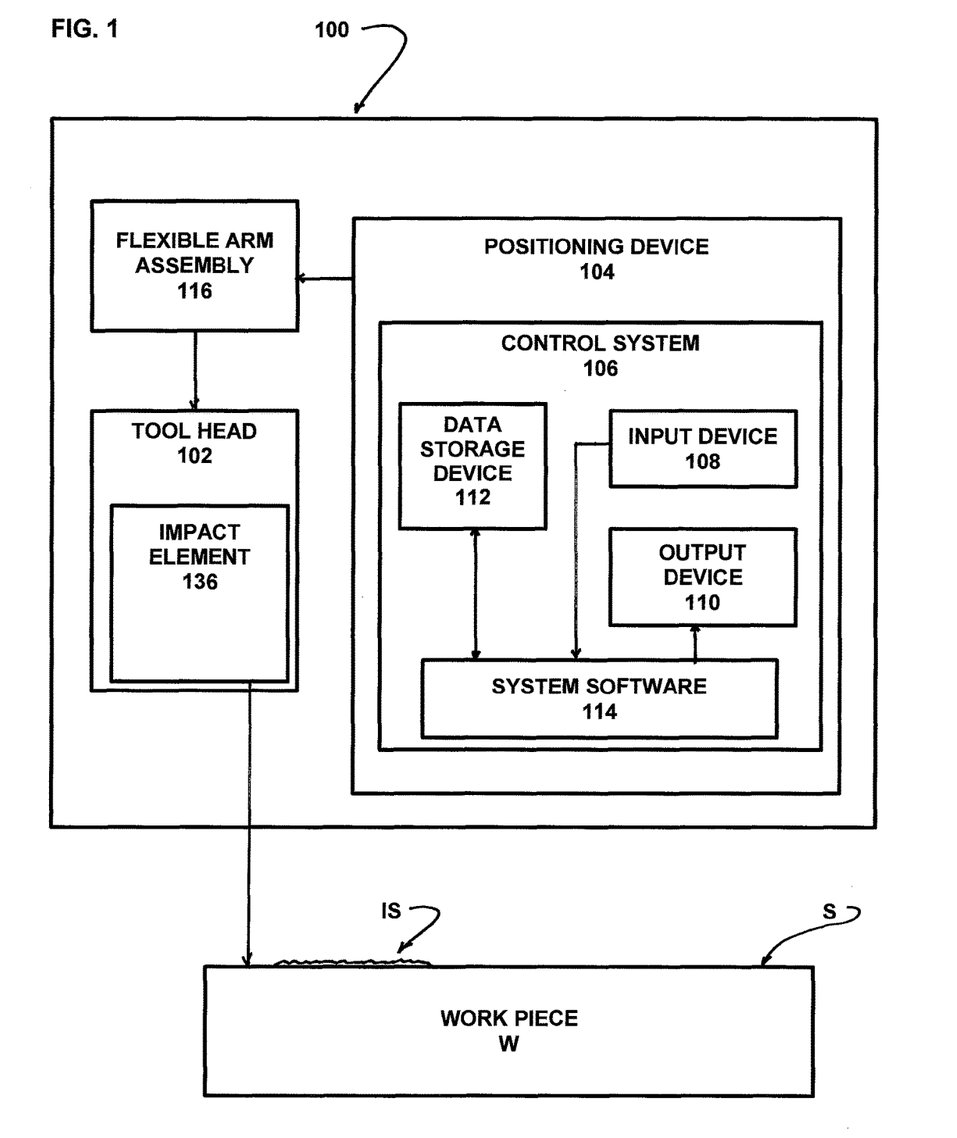
FIG. 1 is a diagrammatic view illustrating the various components of the compression apparatus of the subject invention for inducing compression along and into the surface of a workpiece.
Figure 2:
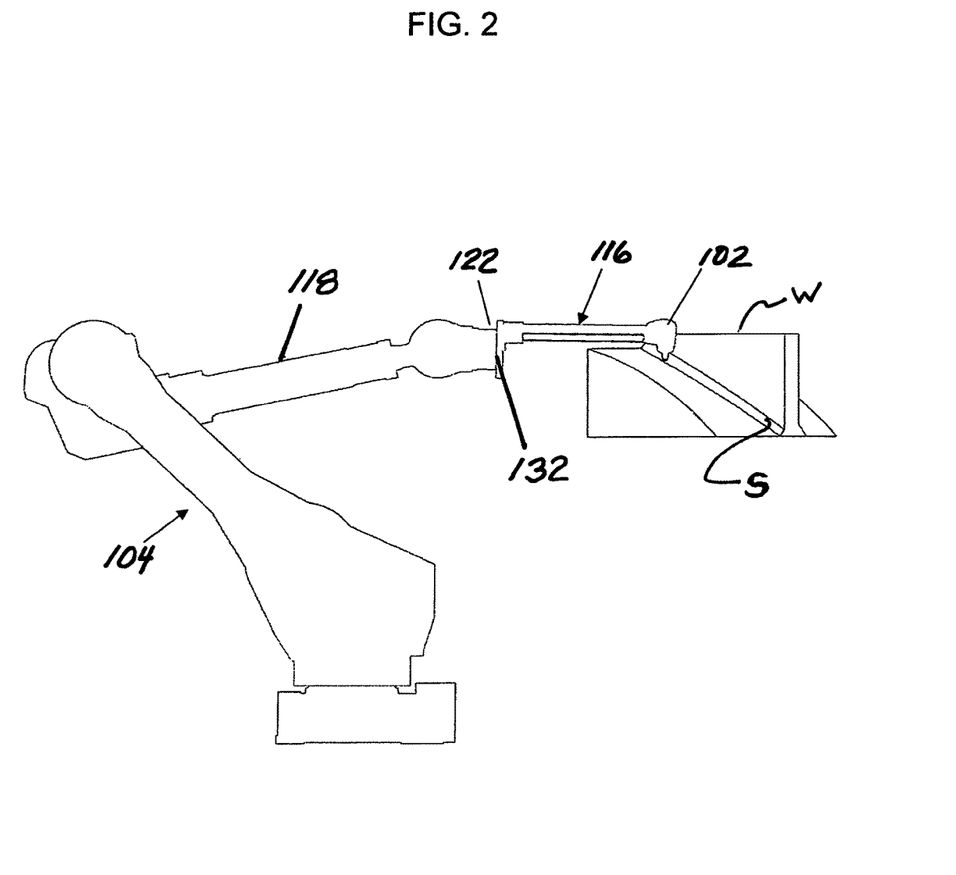
FIG. 2 is a perspective diagrammatic view of the compression apparatus of the subject invention showing the positioning device coupled to the flexible arm assembly for supporting the tool head for inducing compression along and in the surface of a workpiece.
Figure 3:
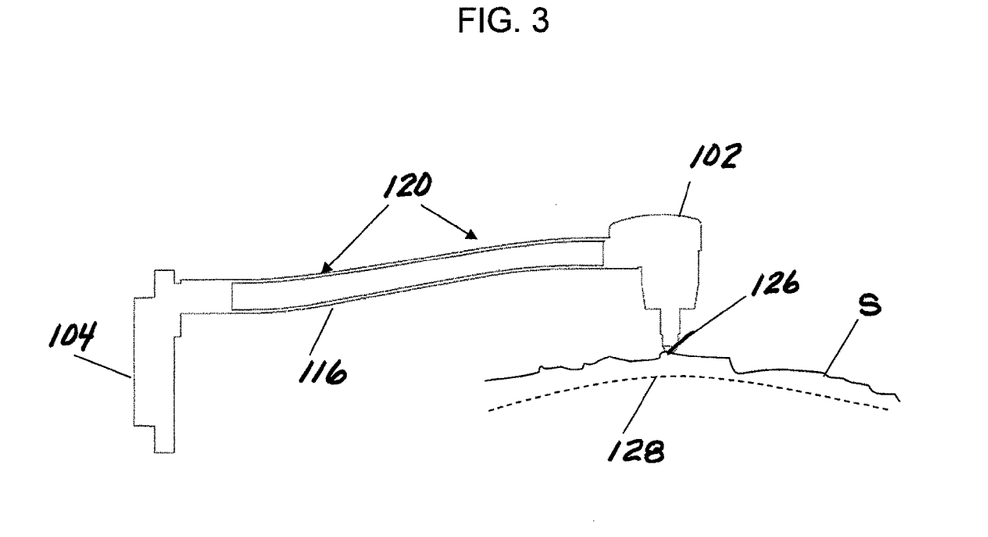
FIG. 3 is another diagrammatic view of the flexible arm assembly of FIG. 2 supporting the tool head effective for inducing compression along and into the surface of a workpiece, the flexible arm assembly operates to maintain the tool head having at least one compression element against the surface of a workpiece having an irregular surface topography.
Figure 4:
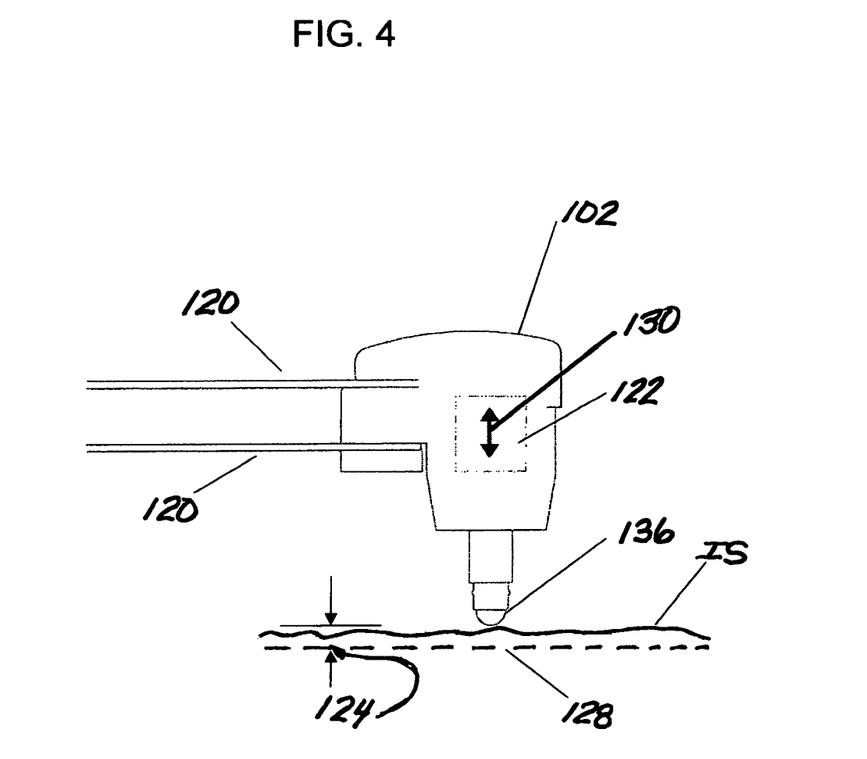
FIG. 4 is a section diagrammatic view of a portion of the flexible arm assembly of FIG. 2 and supporting the tool head and at least one compression element for contacting the surface of the workpiece and having an accelerometer or other transducer for monitoring the force of the compression element on the surface of the workpiece.

FIGS. 1-4 illustrate a preferred embodiment of the invention whereby the compression apparatus 100 for inducing compression along and into the surface of a workpiece includes a tool head 102 for inducing compression along and into the surface of a workpiece. In a preferred embodiment of the invention, the compression apparatus 100 includes a positioning device 104 having a control system 106, such as a computer, robotic system, CNC system, and the like. Preferably, the control system 106 further comprises other devices, such as a suitable input device 108, like a keypad, touch screen, or any other suitable input device that can accept information or instructions from an operator (including operating parameters, instructions directing movement or controlling the direction or path of the tool head during operation); one or more suitable output devices 110, such as a computer display, printer, image-forming or display device, and the like; and a data storage device 112 such as any of the usual devices used for the storage of data, such as computer hard drives, floppy discs, binary codes, optical bits, mechanical scribes, magnetic tapes, compact discs, digital audio tapes, analog tapes, vinyl discs, and any device or devices capable of storing data. It should be understood that the control system 106 can include any combination of the above components, or any number of different components, peripherals, and other devices. Preferably, the control system 106 operates under the control of an operating system, such as the open source Linux operating system, the WINDOWS operating system developed by Microsoft Corporation or the MACINTOSH operating system developed by Apple Computer Corporation. It should be understood, however, that other operating systems could be utilized to implement the system software 114 of the compression apparatus 100 of the present invention. It should be understood that the control system 106 can also comprise conventional CNC code control, but it is understood that the control system 106 may include any computer controlled machine programmed for directing the positioning device 104 to move the tool head 102 along a defined virtual control surface. The workpiece W being processed in FIGS. 2-4 is shown as a right-angle butt weld of two plates, but it is to be understood that the workpiece processed by the invention may be any surface having a relatively smooth surface found on machined or ground components, or an irregular surface topography such as welded component surfaces, cast surfaces, or other surfaces having such an irregular topography.

FIGS. 2, 3 and 4, illustrate in increasing detail, a preferred embodiment of the compression apparatus 100 for inducing compression along and into the surface S of a workpiece W. In FIG. 2, the preferred embodiment the tool head 102 is in the form of an impact tool such as a peening head that is driven by a trip hammer or other similar device that is operated pneumatically, hydraulically, magnetically, or electrically at a controlled reciprocating rate of impact. Preferably, the tool head 102 includes an compression element 136, shown in FIG. 4, in the form of a spherical ball or other geometrically shaped element, having a generally rounded contour (such as an ellipsoid, cylindrical or other geometric shapes) so that the impact of the compression element 136 against the surface of the workpiece W does not produce any sharp surface demarcations that can function as stress risers along the processed surface. It should be understood that the specific geometric shape of the compression element 136 as well as the specific material composition of the compression element 136 is selected for providing a particular surface finish and residual stress distribution for the workpiece. In a preferred embodiment of the invention, the compression element 136 is formed from Cr steel, which provides relatively long tool life while reducing dust, and minimizing replacement needs and cost. Further, the use of Cr steel compression elements reduces or eliminates the formation of surface demarcations that can lead to fatigue crack initiation, such as notches often created during shot peening by broken shot. It should be understood that the compression element can be formed from a variety of other materials having different modules of elasticity, hardness, and other characteristics depending on the material, the particular structure, and the compressive residual stress to be induced along and into the surface of the workpiece.

In another preferred embodiment of the invention, the compression element 136 is mounted within or to the tool head 102 such that it is free to rotate with respect to the tool head 102. It has been found that such rotation permits the compression element 136 to rotate during use thereby allowing the surface of the compression element 136 to be aligned for contacting the surface of the workpiece while evenly wearing the compression element 136 to greatly extend the life of the compression element 136.

The positioning device 104, such as a conventional 6-axis industrial robot, is coupled to a flexible arm assembly 116 attached to the end of a last axis 122 of the positioning device 104. The workpiece W is held in position for processing by a conventional fixture (not shown) or other suitable means of fixing the location and orientation of the workpiece W. In a preferred embodiment of the invention, as shown in FIGS. 3 and 4, the flexible arm assembly 116 includes one or more longitudinally extending parallel springs 120, such as longitudinal extending flat springs, having sufficient length to allow the tool head 102 to be positioned as needed and to access tightly spaced areas of the workpiece W. The springs 120 operate to form a rectangular suspension that deforms to maintain the axis 122 of the tool head 102 normal to the processing surface S of the workpiece W during operation when the tool head 102 is moved across the surface S of the workpiece W being processed.

In a preferred embodiment of the invention, the operating range 124, the distance between the point of contact 126 with the tool head 102 at the irregular surface IS and a virtual control surface 128, is shown in FIG. 4, and is set to be greater than the variation in the topography of the irregular surface IS. The amount of spring preload of the flexible arm assembly 116 is equal to at least the operating range 124 times the combined spring constant of the springs 120 so that the tool head 102 is preferably held at all times in contact with the surface S as well as the irregular surface IS. The preload of the springs 120 are determined to cause the tool head 102 to follow a virtual control surface 128 that is below the actual irregular surface IS (deeper within the surface of the workpiece) by an amount that is greater than the deviations along the surface S of the workpiece W. For example, if the variation in weld topography for a group of welded workpieces to be processed was 0.25 inches, defining a virtual control surface as 0.5 inches below the surface ensures the tool head 102 remains in constant contact with the irregular surface IS. The actual amount of spring preload may vary from the example illustrated, and may be changed over any range that will keep the tool head 102 in contact with and not overload the springs 120 of the flexible arm assembly 116. It should now be apparent that when the flexible arm assembly 116 presses the compression element 136 against the surface S of the workpiece W in order to follow the virtual control surface 128 located below the actual irregular surface IS of the workpiece W, the reciprocating axis 130 of the tool head 102 is then held parallel to the face 132 of the last axis 118 of the positioning device 104. In this way, the force being applied against the surface S of the workpiece W is at all times held normal to the control surface 128 so that the force deforming the irregular surface IS of the workpiece W remains constant even in the event a complex surface is followed.

Figure 5:
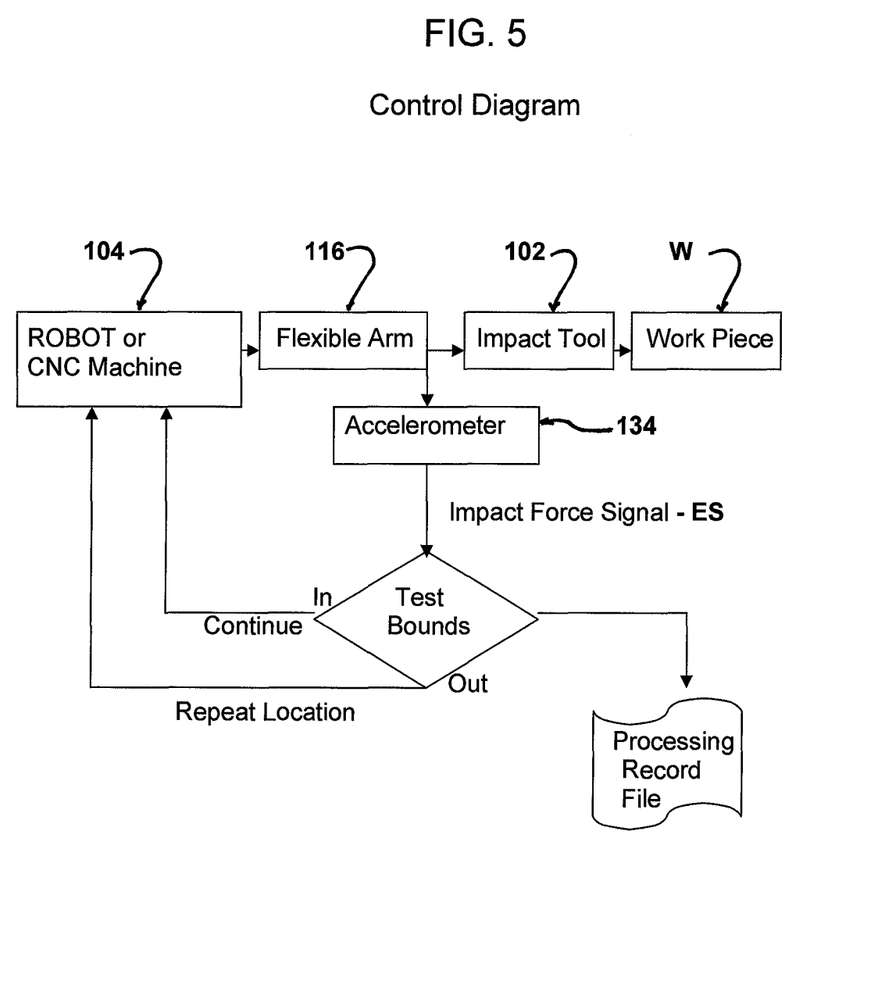
FIG. 5 is a control diagram showing connections and linkages for sensing compression force and control of the position of the tool head of the subject invention during processing.

Referring to FIG. 5, in a preferred embodiment of the invention, the compression apparatus includes a tool head having an accelerometer 134 attached to the tool head 102 or, alternately the end of the springs 120, and produces an electrical signal ES proportional to the force being applied against the surface S of the workpiece W. The signal ES is used by the control system 106 and is calibrated to allow direct determination of the force being applied against the surface S of the workpiece W in real time during processing. It should be understood that other devices such as load cells, microphonic transducers, or other force sensing transducers may be used together with or as an alternative to an accelerometer for determining the force being applied against the surface of the workpiece. The control system 106 operates to monitor the force, compares it to the upper and lower force operating bounds, and the system software 114 operates to direct the data storage device 112 to record the processing and any detected errors in the force that falls outside of the allowed range. The system software 114 preferably operates to select from a range of actions in the event of a force fault, such as, to simply indicate the occurrence of the fault, rejecting the workpiece, or interrupting the process and repeat the processing of the workpiece at the location of the fault. It should now be understood by one skilled in the art that other actions, not noted here, may be taken as well with respect to the manufacturing or processing of the workpiece. In a preferred embodiment, the system software 114 operates to provide an output on the output device 112 to warn a system operator that a fault has occurred. The operator can then review the workpiece and the identified fault and using the input device 108 can provide additional processing instructions into the control system 106 for the workpiece which can then be implemented by the system software 114 of the compression apparatus 100.

Figure 6A:
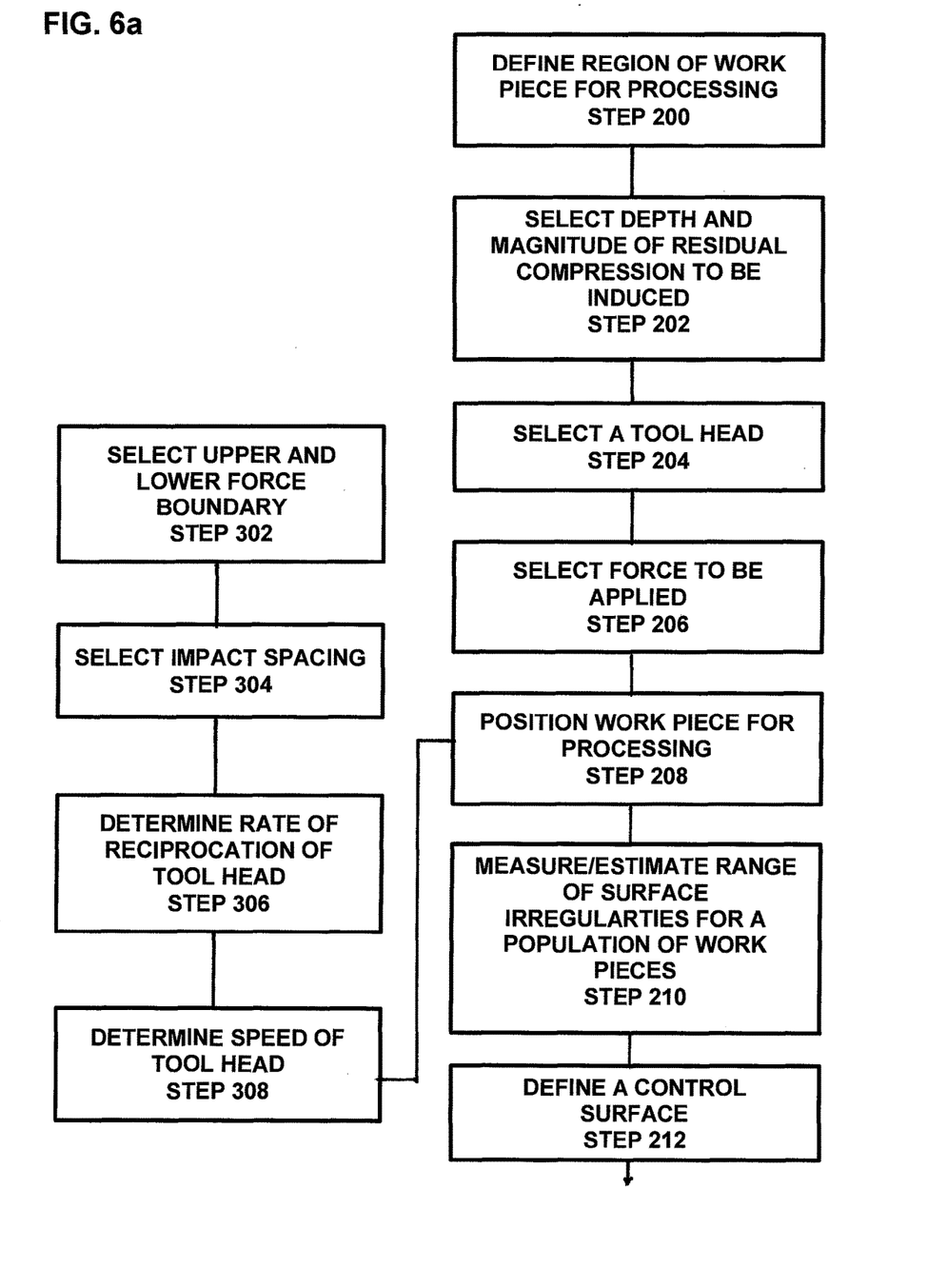
FIGS. 6a, 6b is a flow chart showing the method of the subject invention for inducing compression along and into the surface of a workpiece.
Figure 6B:
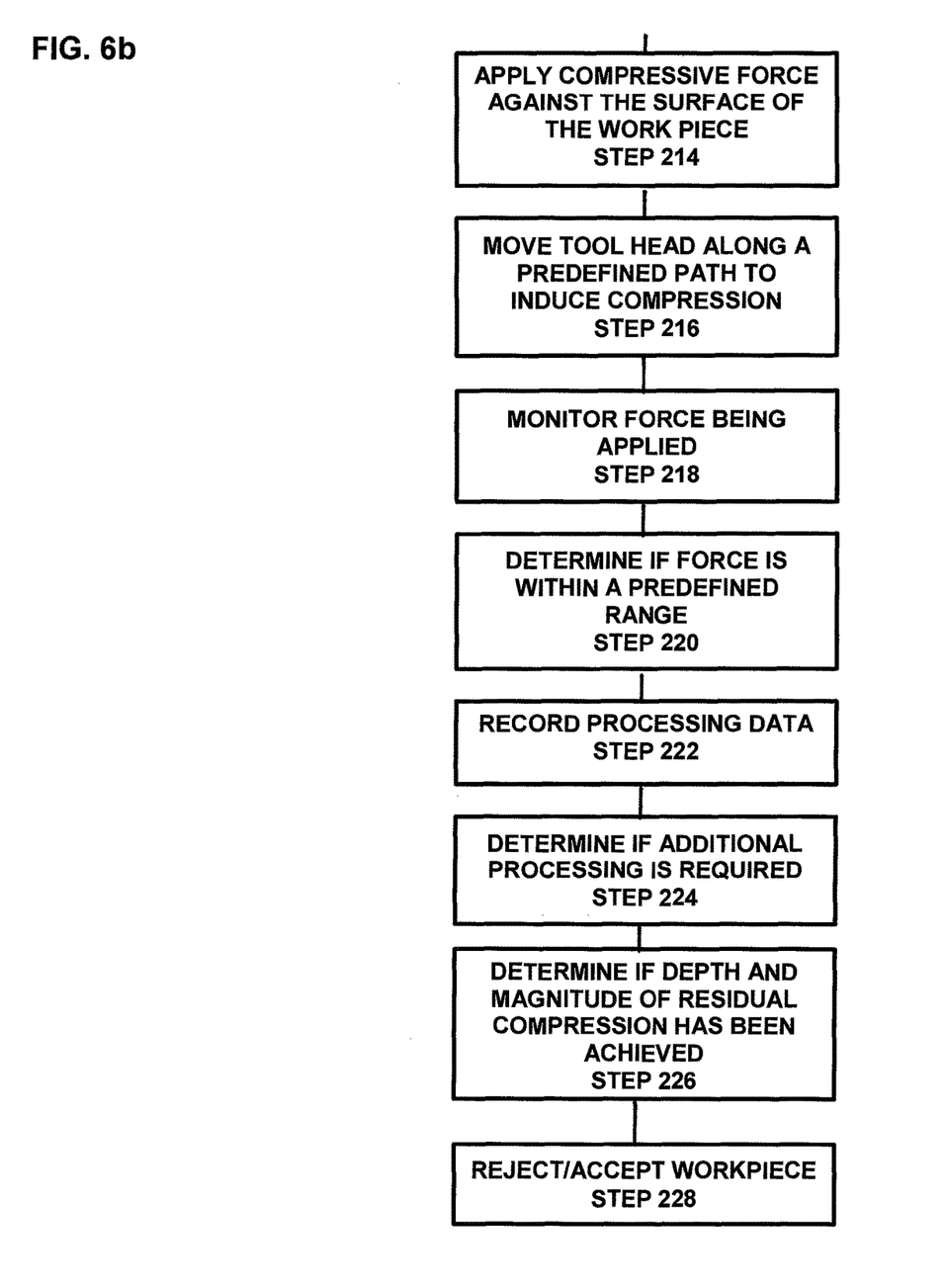

Referring to FIGS. 6a-6b, the method of inducing compression along and into the surface of a workpiece comprises the steps of defining a region of the component for processing (step 200). In an exemplary illustration, such regions may include regions of high tensile residual stresses in weld fusion and heat affected zones (HAZ) along the surface of a component and containing notches at the weld toes and those formed by the overlapping passes of welding. The process zone of the example extends through the fusion, heat affected zone (HAZ) and into the parent metal beyond the weld. The depth and magnitude of residual compression needed to achieve the required fatigue performance is determined from prior failure analysis, observation of surface flaws, measurement of existing residual tensile stress, fracture mechanics analysis, and/or other conventional materials performance methods (step 202). It should be understood that processing of welded areas may be done when the surface is at an elevated temperature, such as a result of welding or heated by other means, to provide deeper and higher magnitude of plastic strain than produced by treating the surface at room temperature. A tool head having a suitable diameter to provide access to the surface features and geometry of the workpiece to be processed and which provides a suitable surface finish is selected (step 204). A force and the allowed upper and lower force bounds that will produce suitable depth of compression are selected (step 206). The workpiece is positioned on a suitable stand, conveyor or other means, so that it is in a fixed reproducible position, accurate within the irregularities of the surface, for processing of a number of like workpieces (step 208). The workpiece surface irregularity is determined by measuring and/or estimating the range of variation for the population of pieces to be processed (step 210). A virtual control surface is defined at a distance between the actual surface being processed and below the actual surface as described above (step 212). The tool head is then moved along following the virtual control surface in a pattern such that the compression elements contacts the surface with sufficient compressive force to create a desired distribution of residual stress and surface finish (step 214). It should be understood that the control system software, such as CNC processing control code, is prepared for the particular positioning device that positions the tool head for providing compression along the virtual control surface so that the springs deflect forcing the compression element(s) against the surface, including any irregular surface portions of the workpiece. The tool head is moved over the surface at the speed and in the pattern necessary to cover the surface to be processed and induce the desired compression along and within the surface of the workpiece (step 216).

In a preferred embodiment of the invention the force being applied against the surface of the workpiece is monitored by the accelerometer, or other force sensor, attached near the tool head (step 218). The force measured as a calibrated electrical signal is read by the control system and the system software operates to compare to a requested or predetermined desired force to determine whether the area being processed is being treated properly, that is, within the range of force needed to produce the depth and magnitude of compression required (step 220). Preferably, the processing data is recorded by the data storage device and the system software operates to compare it to the predetermined desired force to provide processing quality control records (step 222). Because the measurement of the compression force is measured in real time during the processing, if desired, the control system can operate to determine if additional processing is required and if additional processing is needed it can operate to reposition the tool to repeat the processing of the affected area of the workpiece (step 224). Preferably, the location and the force and/or any deviation in force being applied along the surface are recorded and a determination can be made if treatment of the surface of the workpiece has been properly achieved (the depth and magnitude of residual compression has been achieved) (step 226). If in the event the desired amount of compression has not been achieved, the control system can operate to reject or identify the workpiece for further processing (step 228). It should now be apparent that the mechanical linkages of the positioning device, flexible arm assembly, and tool head provide the location and speed of positioning of the tool head along the workpiece while following the predefine path (control surface) inputted into the control system using the input device, such as inputted into the system software, such as a CNC programmed code. An output signal from the accelerometer or feedback loop provides closed loop control for comparing to the preset minimum and maximum force bounds. If the force is outside of the allowed processing bounds, the control software is programmed to record the error, reject the workpiece (component), and/or signal the positioning device to reposition the tool head to repeat the treatment for inducing compression at the location where the fault occurred. The system software of the control system can also be programmed to record into the data storage device the entire sequence of processing (including for a impact tool recording information concerning the individual impacts) to provide a detailed record of the processing. Alternately, it may simply record the success or failure of the processing and indicate that to the operator. In another preferred embodiment of the invention, the control software of the control system can operate to compare the force applied at a location with the preset minimum and maximum force bounds and determines if the amount of force applied to the surface at the location and if additional processing is required. The system software then operates to calculate the correction force that must be applied to the surface at that location to induce the desired compression (compressive residual stress).

As shown, the mechanical linkages of the control system, positioning device, flexible arm assembly, and tool head operate together to provide the location and speed of positioning of the tool head along the surface of the workpiece while following the control surface. The output signal from the accelerometer or feedback loop provides closed loop control and is compared by the control system to a minimum and maximum force boundary. If the force is outside of the allowed processing force boundary, the system software of the control system operates to record the error, reject the component, and/or signal the robot to reposition the tool to repeat the compression treatment at the location where the fault occurred. The system software further operates to record the entire sequence of processing and provides a detailed record of such processing. Alternately, in a preferred embodiment the system records the success or failure of the processing and indicates that to the operator.

In a preferred embodiment of the invention the method includes determining the compression force and the allowed upper and lower force bounds that will produce suitable depth of compression are selected (step 302). In a preferred embodiment of the invention, the compression force is imparted along the surface of the workpiece by impacting the surface with the compression element such that the impact spacing is selected to produce the required residual compression, and/or cold work, and/or a suitable surface finish (step 304). The rate of reciprocation of the impacting tool is selected to allow calculation of the positioning speed for the desired spacing and the time required for processing the selected area (step 306). It has been found that preferably the impact rate or frequency of the tool head is from about 1 to about 100 impacts or strikes per second. In a preferred embodiment the speed of moving the tool head over the surface of the workpiece is calculated to provide the desired impact spacing (step 308). It should be understood that the impact spacing may be varied for the purposes of changing both the residual stress distribution and the surface finish by altering the speed of tool positioning.

Figure 7:
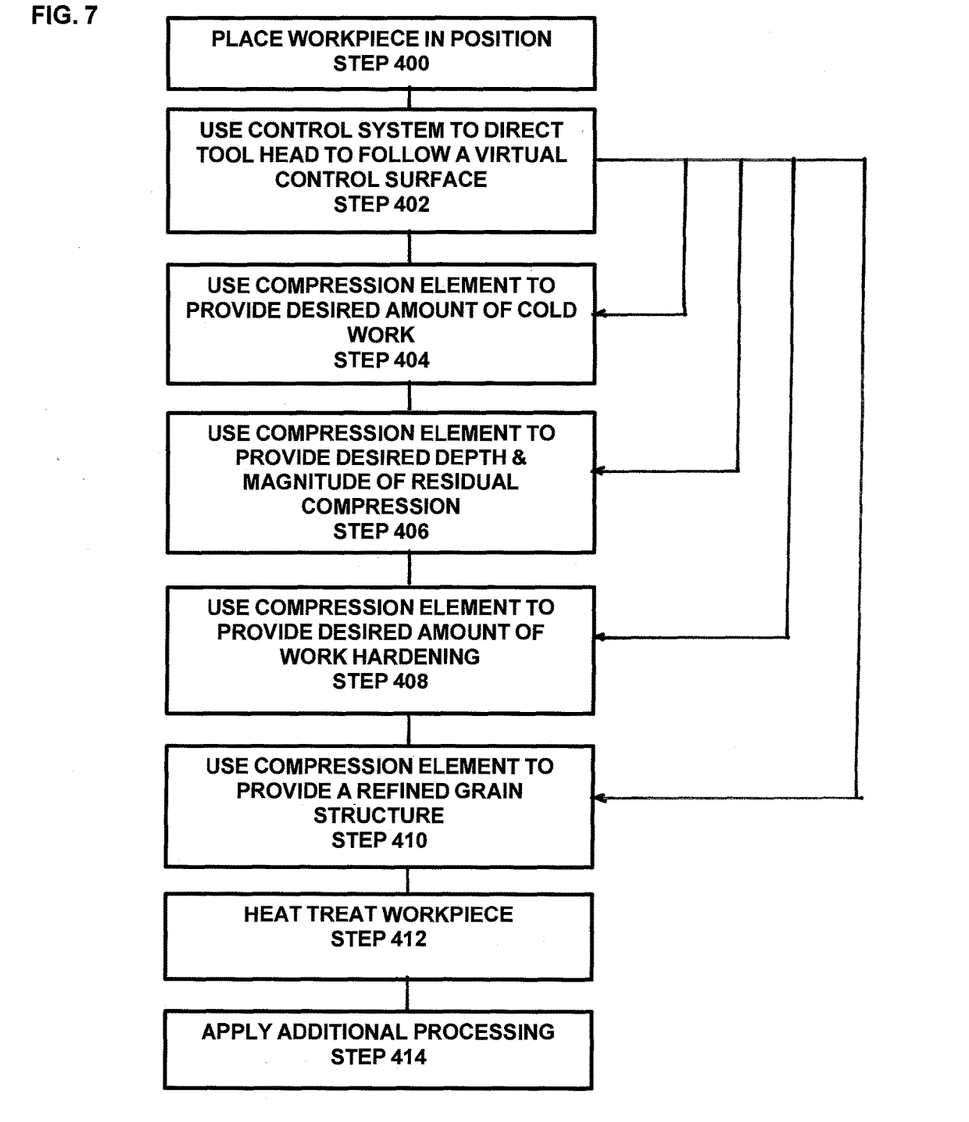
FIG. 7 is a flow chart showing another preferred method of the subject invention for inducing a controlled amount of cold work along and into the surface of the workpiece.

In another preferred embodiment of the invention, as shown in FIG. 7, the method of the subject invention for inducing compression along the surface of a workpiece comprises the steps of placing a workpiece in position for processing (step 400) and using a control system to direct a tool head having a compression element such that said tool head follows a virtual control surface (step 402). It should be understood that the virtual control surface is positioned between the surface of the workpiece and a distance within the workpiece. A compression element is then used to contact the surface of the workpiece and provide controlled cold work along and within the surface of the workpiece (step 404). In a preferred embodiment, the method further comprises the step of using the compression element to contact the surface of the workpiece and create a specific controlled zone of plastic deformation achieving a prescribed depth and magnitude of residual compression along and within the surface of the workpiece (step 406). In a preferred embodiment, the method includes the step of determining the amount of controlled cold work to achieve a desired amount of work hardening of the surface of the workpiece (step 408) and/or the desired amount of controlled cold work to achieve a desired amount of refined grain structure along and within the surface of the workpiece (step 410). After the surface of the workpiece has been treated, the workpiece can be heat treated (step 412) or have other processes applied, such as plasma sprays or other similar coatings applied (step 414).

Figure 8:
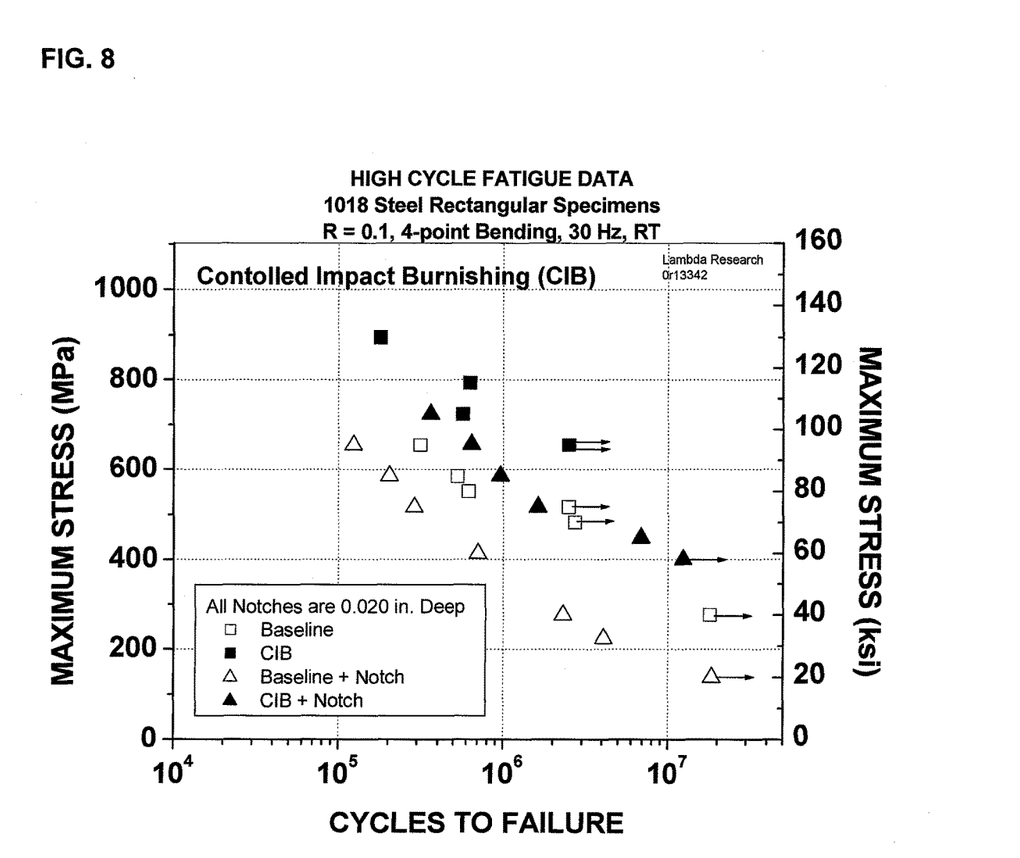
FIG. 8 is a plot of high cycle fatigue data and damage tolerance achieved by the apparatus and method of the subject invention illustrating the increase fatigue strength of a workpiece having damage along the surface.
Figure 9:
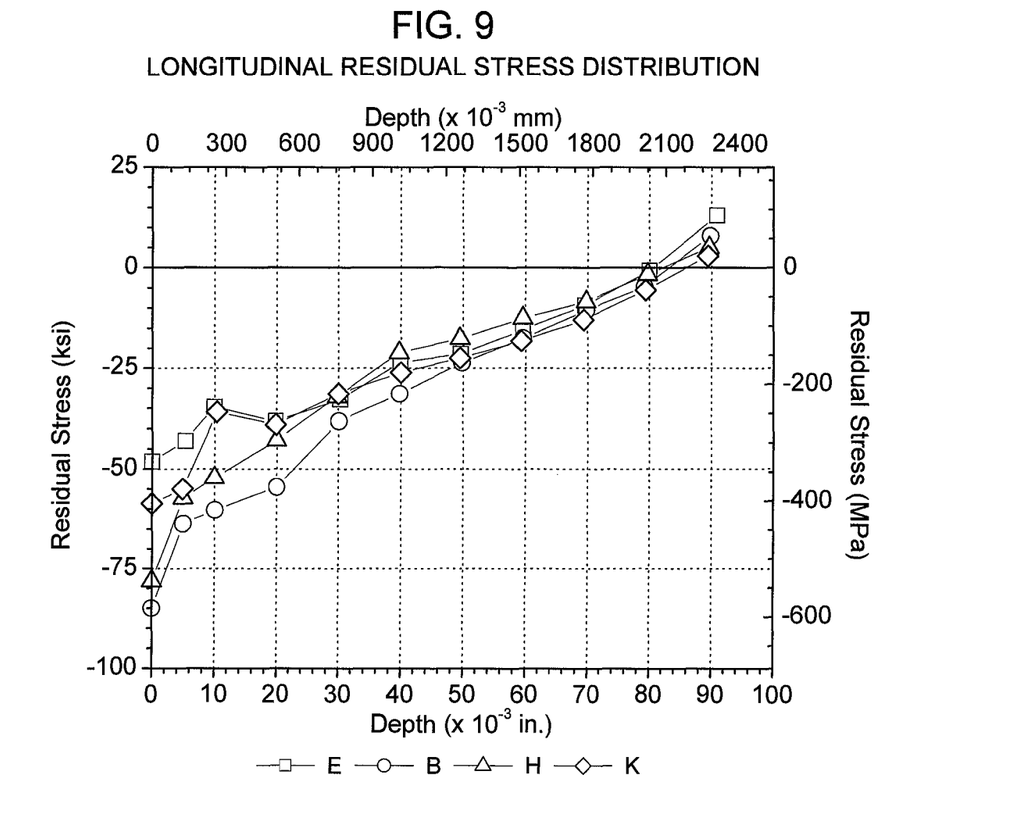
FIG. 9 is a plot of the longitudinal residual stress distribution as a function of depth produced by the present invention.

Referring to FIG. 8, is a plot of high cycle fatigue data and damage tolerance achieved by the apparatus and method of the subject invention and illustrates the increase fatigue strength of a workpiece having damage along the surface. The residual stress distributions unexpectedly found to be produced by the invention using a tool head comprising a compression element for impacting the surface of the workpiece is shown in FIG. 9. Unlike most peening operations, the residual compression is found to be maximum at the surface, and to extend nearly linearly to a depth of over two (2) millimeters. Conventional shot peening, deep rolling, or low plasticity burnishing deform the surface in Hertzian loading causing maximum compression to occur below the surface where the maximum Hertzian shear occurs. The form of the residual distribution produced by the present invention using a tool head comprising a compression element (or a peening tool) for impacting the surface of the workpiece was expected to follow the same Hertzian form. It was unexpectedly found however that the invention of the subject application produces both maximum compression at the surface and compression deeper than typically achieved with the other available methods, and operates to improve fatigue strength and damage tolerance in workpieces. It is known that because fatigue cracking initiates at the surface, having maximum compression occurring at the surface will provide the maximum high cycle fatigue performance of the component. The greater depth of compression allows deeper damage of any sort to be tolerated by holding the notch formed in high compression. Both the high surface compression and greater depth of compression are known to be beneficial in suppressing SCC by maintaining the surface, and any near surface material affected by intergranular corrosion, below the tensile stress threshold for cracking. Accordingly, the compression apparatus and method of the subject invention produce both maximum compression at the surface and compression deeper than typically achieved with the other available methods, thereby operating to improve fatigue strength and damage tolerance in components.

A method and compression apparatus for improving the fatigue and stress corrosion cracking performance of irregular surfaces of components, such as welds, using robotic or CNC machine to position a tool head for inducing compression along and into the surface of a workpiece to automatically follow the surface irregularities. The tool head is operates and follows the irregular surface by a flexible arm assembly while following a virtual control surface located below the actual surface of the workpiece and allowing the irregular topography surface to be uniformly processed. In a preferred embodiment, cold working is minimized by using single impact spacing at controlled intervals. In another preferred embodiment of the invention, the spacing and impact force are controlled to introduce a desired amount and depth of cold working. Impact force is measured and compared to target values for performance documentation and correction by repositioning, such as through CNC control, to recover any missed or inadequately peened region. Thus, the subject apparatus and method of the subject invention allows for full coverage of compression without repeated treatment (such as without impacting the surface of the workpiece repeatedly) thereby minimizing cold work of the surface. Minimizing the amount of cold work eliminates or reduces softening of components formed from hardened steels and reduces swelling and other unacceptable changes in critical dimensions due to cold work induced phase transformations.

It should now be apparent to one skilled in the art that the compression apparatus and method of the subject application allows compression to be induced along and into the surface of a workpiece using a relatively small tool head such that compression can be induced in confined areas, such as in weld assemblies (i.e. welded closed impeller components). Further, during operation various surface configurations can easily be treated without requiring modifying processing codes and other systems.

It should also now be apparent to one skilled in the art that the compression apparatus and method of the subject invention permits the inducement of compression along and into the surface of the workpiece to be performed in a controlled manner and/or with a minimum amount of cold working of the surface thereby improving thermal and mechanical stability of the treatment and with optimum efficiency and low cost. Further, the compression apparatus and method of the subject invention permits the use of a tool head in the form of an impact tool that provides controlled impact of the compression element against the surface of the workpiece thereby eliminating or reducing the possibility of laps or folds being formed along the surface of the workpiece typically produced in shot peening caused by overlapping shot impact zones.

The use of the compression apparatus and method of the subject invention produces nearly linear residual stress depth distribution similar to laser shock peening processes but to a greater depth. Further, unlike shot peening and low plasticity burnishing that generally produces subsurface maximum compression with reduced compression at the surface, the compression apparatus and method of the subject invention having a tool head in the form of an impact tool head provides maximum compression at the surface of the workpiece for maximum resistance to surface fatigue crack initiation or SCC. Further, depth of compression is sufficient to prevent fatigue crack growth from surface flaws generally too small to be detected by NDT inspection methods (<0.020 inches deep) while providing a safe and generally reliable means for restoring components to service following conventional NDT inspection.

Accordingly, the method and compression apparatus of the subject invention for inducing compressive residual stress along and into the surface of workpiece; preferably is an automated system by use of a positioning means, such as a robotic or other CNC machine tool; produces a desired depth and magnitude of compression; and is reliably applied to work pieces having an irregular topography surface.

The compression apparatus and method for inducing compression along the surface of a work piece provides a unique apparatus that operates to perform a controlled amount of cold work and surface hardening of the surface as well as being able to operate to induce controlled compression along and into the surface of a work piece having surface irregularities. It should now be apparent that by positioning the tool head to follow a predefined virtual control surface while holding the compression element in contact with the workpiece or ensuring the compression element continues to strike the surface of the workpiece (for an impact tool head), eliminates the need for precise prior knowledge of the workpiece surface topography and the need for complex and expensive systems for locating and following surface irregularities. It should be understood that the compression apparatus and the structured methodology utilized by the control system is not limited solely to the specific design described herein and although the foregoing invention has been described in some detail for purposes of clarity of understanding, it should now be apparent that certain changes and modifications may be practiced within the scope of the disclosure and that the various embodiments presented can be easily modified while keeping within the scope and spirit of the subject invention. Accordingly, it should also be understood that the present disclosure is to be considered as exemplary of the principals of the invention and is not intended to limit the invention to the embodiments and the specific examples illustrated and the invention is not to be limited to the details given herein, but may be modified within the scope and equivalents of the descriptions and examples contained herein.

What is claimed is:

1. A method of inducing compression along a surface of a predefined area of a workpiece comprising the steps of:
   placing a workpiece in position for processing;
   determining surface irregularity along the predefined area by calculating a range of variation of surface topography using a population of workpieces;
   using a control system to direct a compression apparatus having a tool head in the form of an impact tool and wherein the control system operates to control the tool head so that the tool head operates with a predefined force of impact, reciprocating rate and spacing of impacts against the surface of the of the predefined area and wherein the tool head follows a predefined virtual control surface positioned within the workpiece below the actual surface of the predefined area by an amount that is greater than any surface irregularity along the surface of the predefined area so that any surface irregularity along the surface of the predefined area is processed with the predefined force of impact; and
   using the tool head to strike the surface of the workpiece and create a specific controlled zone of plastic deformation achieving a prescribed depth and magnitude of residual compression along and within the surface of the workpiece.

2. The method of claim 1 further comprising the step of using a control system to monitor the impact force being applied against the surface of the workpiece and comparing the impact force to upper and lower operating bounds to detect any impact force that falls outside the upper or lower operating bounds.

3. The method of claim 2 further comprising the step of providing a warning to a system operator that an impact force is outside the upper or lower operating bounds.

4. The method of claim 1 further comprising the step of using the control system to monitor and record the movement of the tool head and the force being applied against the surface during processing of the workpiece.

5. The method of claim 1 further comprising the step of using the control system to determine if the force of impact exerted against the surface of the workpiece at a location within the predefined area is not within the predetermined range for producing the prescribed depth and magnitude of residual compression along and within the surface of the workpiece along the predefined area, and using the control system to position and control the movement of the tool head to restrike the surface of the workpiece at the location.

6. The method of claim 1 wherein the tool head stroke is in a direction towards the surface of the workpiece and wherein the predefined virtual control surface is located within the range of the stroke of the tool head and below the actual surface of the workpiece.

7. The method of claim 1 wherein the desired reciprocating rate is from about 1 to about 100 strikes per second.

8. The method of claim 1 wherein the spacing of impacts minimizes excessive deformation and cold working of the surface.

9. The method of claim 1 wherein the tool head comprises at least one compression element having a geometric shape such that it does not produce an area of demarcation when it strikes the surface of the workpiece.

* * * * *